United States Patent [19]
Klein et al.

[11] Patent Number: 5,900,935
[45] Date of Patent: May 4, 1999

[54] HOMODYNE INTERFEROMETER AND METHOD OF SENSING MATERIAL

[76] Inventors: Marvin B. Klein, 1331 Avenida de Cortez, Pacific Palisades, Calif. 90272; G. David Bacher, 11661 Pincian Way, Santa Ana, Calif. 92705; David D. Nolte, 4155 Eisenhower Rd., LaFayette, Ind. 47905; Indrajit Lahiri, 144 Halsey Dr., Apt. 8, West LaFayette, Ind. 47906

[21] Appl. No.: 08/995,655

[22] Filed: Dec. 22, 1997

[51] Int. Cl.⁶ .................................................. G01B 9/021
[52] U.S. Cl. ............................ 356/347; 356/357; 73/656
[58] Field of Search .................................. 356/352, 357, 356/349, 432 T, 358, 347, 351; 73/655, 657, 656

[56] References Cited

U.S. PATENT DOCUMENTS 5,131,748  7/1992  Monchalin et al. ..................... 356/358
5,680,212  10/1997  Blouin et al. ........................... 356/347

*Primary Examiner*—Samuel A. Turner
*Attorney, Agent, or Firm*—Thomas A. Turner, Jr.

[57] ABSTRACT

Faults, dimensions and other characteristics of a material or structure are sensed by a coherent beam's reflection from the material during ultrasonic or very fast vibration. The reflected beam acquires a phase substantially different from its original phase and from the phase of a reference beam split from the common source beam. The reflected beam and the reference beam are superimposed by diffraction in a multiple quantum well adaptive holographic beamsplitter, and the superimposed beams are detected by a photodetector capable of detecting small interference changes from ultrasonic surface displacements or perturbations. An apparatus and method defining an improved homodyne interferometer for performing the method is described.

24 Claims, 7 Drawing Sheets

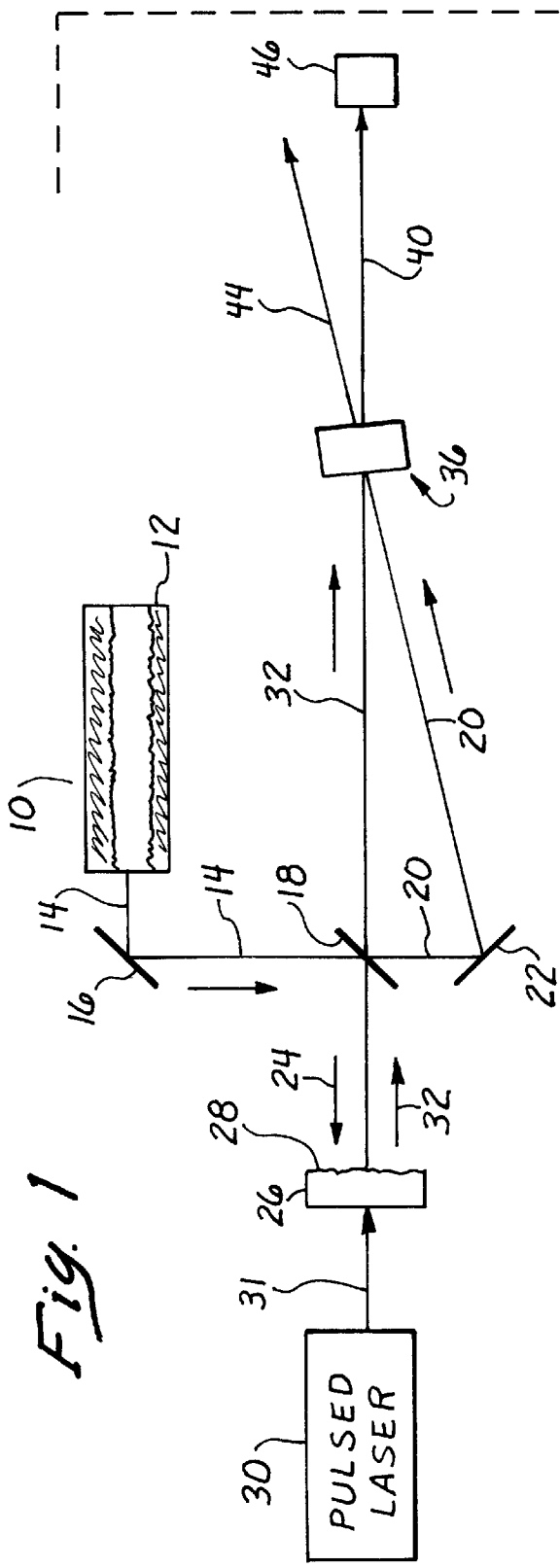
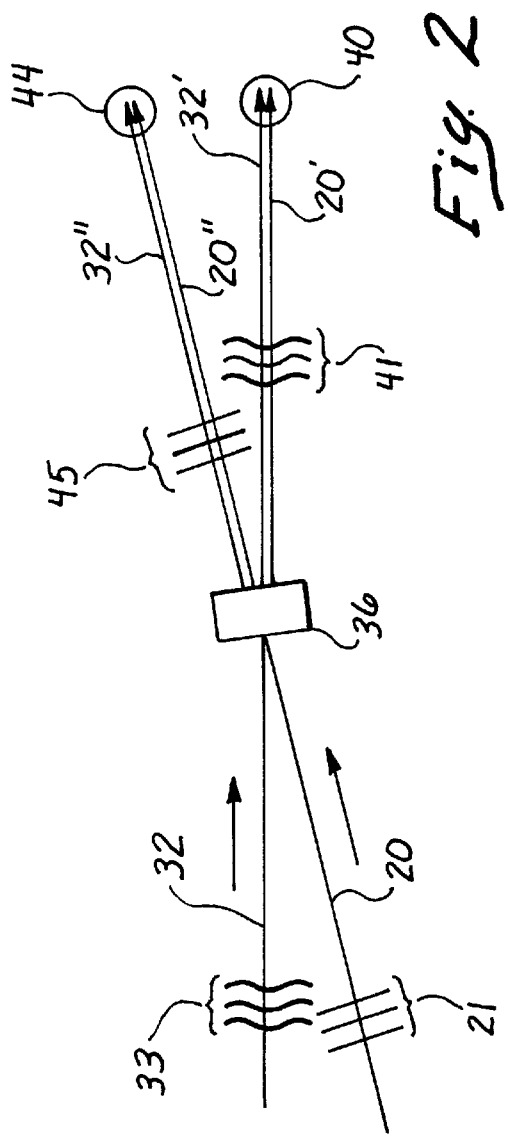

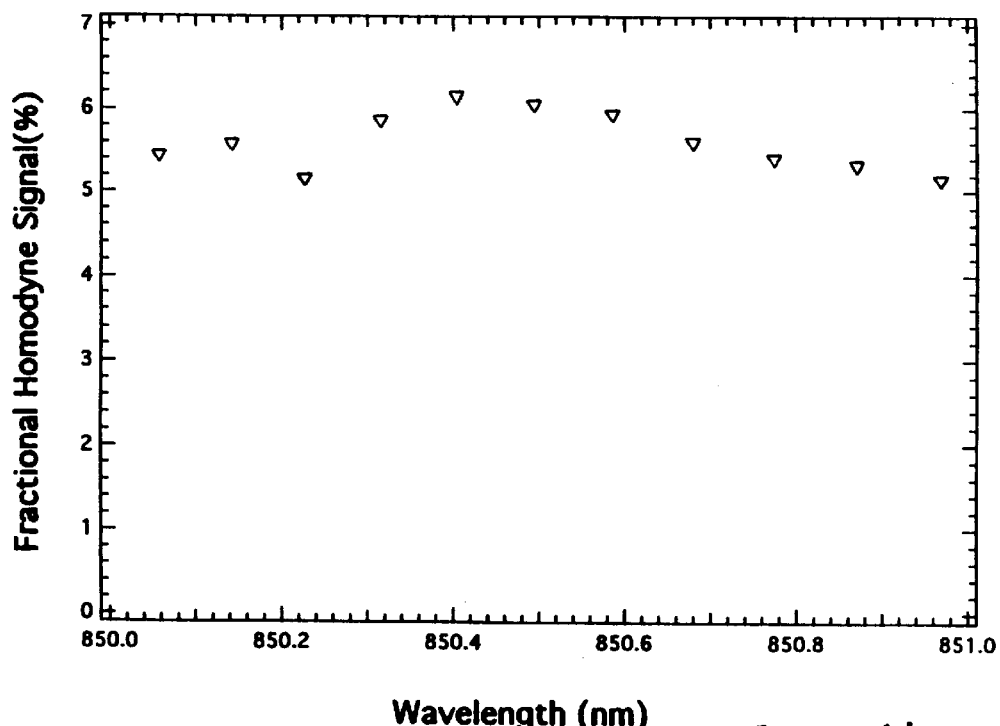
Fig. 11
Fig. 12
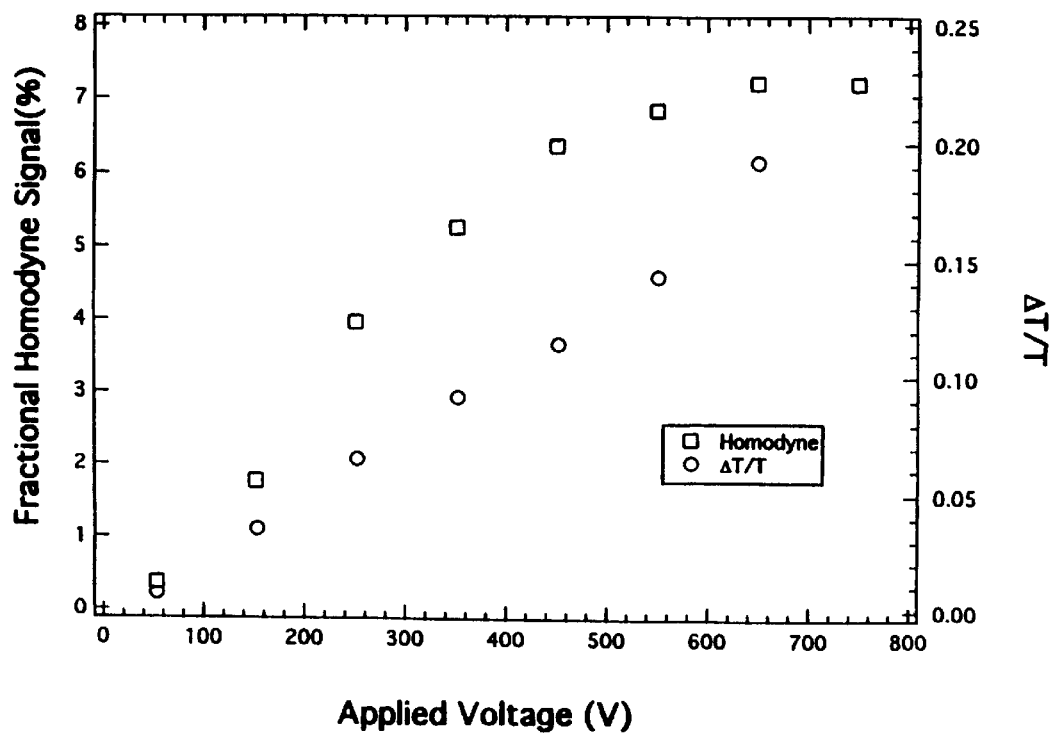

HOMODYNE INTERFEROMETER AND METHOD OF SENSING MATERIAL

BACKGROUND OF THE INVENTION

1. Field of the Invention

The present invention relates to the art of detecting faults and other characteristics in materials, and more particularly to methods and apparatus for detecting faults and other characteristics in ultrasonically vibrated test material using homodyne interferometers.

2. Background of the Invention

Laser ultrasonic receivers based on optical homodyne interferometers have been investigated for some years. Such receivers have been used and proposed for the examination of materials, such as, for example, investigating transient body transformations, inspecting materials such as metals and ceramics at high temperatures for process and quality control, detecting flaws as soon as they are created, measuring production parameters such as thickness and temperature, and determining microstructural properties on-line such as grain size, porosity and the like. In early research, it was realized that a homodyne interferometer could not operate effectively with the speckled beams that result from reflecting from rough surfaces. Furthermore, such early homodyne interferometers could not compensate for aberrations in the signal beam wavefront resulting from slow, dynamic environmental disturbances.

Time-delay or self-referencing interferometers have been developed, such as the confocal Fabry-Perot which allow the processing of light scattered from rough surfaces with a large field of view. Usually, a phase modulated signal beam is derived from a probe beam scattered or reflected from a vibrating test surface. This beam is demodulated by the slope of the transfer function, which is the transmission versus frequency, of the confocal Fabry-Perot. As a self-referencing or time-delay interferometer, the confocal Fabry-Perot has the ability to process speckled beams from imperfect surfaces. In addition, the particular mirror curvature of the confocal Fabry-Perot provides a much larger field of view than a Fabry-Perot with flat mirrors. The operation of the confocal Fabry-Perot is described in, for example, U.S. Pat. No. 4,659,224. However, the confocal Fabry-Perot requires stabilization of the interferometer length to a fraction of an optical wavelength, thereby adding complexity and cost to the receiver.

The transmitted signal from a confocal Fabry-Perot is proportional to the amplitude of the Doppler shift of the signal beam frequency upon scattering from a vibrating surface. For constant displacement, the Doppler shift decreases with frequency. As a result, the confocal Fabry-Perot does not work well at low ultrasonic frequencies below approximately one megahertz (1 MHz). Solutions to such problems and limitations have been proposed. See, for example, U.S. Pat. No. 5,131,748 to Monchalin and Ing, where the beam that probes the vibrating surface is caused to interfere inside a photorefractive material with a reference or pump beam, resulting in these two beams diffracting in each other's direction with a common path and a common wavefront. An electrical signal dependent on phase excursions or perturbations in the reflected or scattered beam produced by the surface vibration is then obtained by a photodetector in one of these paths. For the correct static phase difference between the wavefronts of the two interfering beams, the electrical signal is linearly proportional to the phase excursion and thus to the surface deflection. The photorefractive material acts in effect as a real-time hologram providing an exact overlap of the reference beam with the signal beam for later coherent detection and it compensates for low frequency dynamic environmental distortions in the signal wavefront. However, most materials used previously do not have both a fast response time and a large diffraction efficiency which is desired for uses in many applications. Such systems also do not operate well at low signal beam light levels produced when scattering from a rough surface, as is typical for many workpieces.

It is still desired to obtain a homodyne interferometer that is characterized by a very fast response time, on the order of microseconds (at intensities on the order of 10–100 milliwatts per square centimeter ($mW/cm^2$)), while maintaining high diffraction efficiency. It is still desired further to provide a homodyne interferometer that will have the capability of processing speckled returns from the workpiece with a high field-of-view or étendue. It is desired yet further to obtain a homodyne interferometer having an adaptive holographic beamsplitter which can be fabricated more easily, with greater flexibility and is capable of being fabricated (or grown) more rapidly and at lower cost.

SUMMARY

In brief, in accordance with one aspect of the present invention, a coherent, polarized light beam is split, one of the beams being used as a reference beam. The other beam is reflected or scattered from a surface of the material which is vibrated by an ultrasonic frequency source. The reflected beam has its phase shifted in proportion to the surface deflection or perturbation and is impinged on the surface of a multiple quantum well adaptive holographic beamsplitter. The reference beam is also impinged onto the surface of the multiple quantum well adaptive holographic beamsplitter to create effectively an interference of the two beams, resulting in a refractive index and/or an absorption grating. This grating causes the beams to diffract into each other, so that the original beam and the diffracted beam are co-propagating and have identical wavefronts. The beam with superposed wavefronts is received by a photodetector which senses the high frequency dynamic phase difference between the two beams and produces a signal representative of the perturbations of the vibrating test surface.

Using photorefractive multiple quantum wells, the resulting homodyne interferometer has a response time on the order of microseconds, which allows the receiver to compensate for wavefront disturbances with bandwidths up to approximately one megahertz (1 MHz). In addition, it has the ability to operate at very low light levels. The multiple quantum well adaptive beamsplitter is more versatile in design capabilities, and can be fabricated or grown in less than a day.

Other novel features which are believed to be characteristic of the invention, both as to organization and methods of operation, together with further objects and advantages thereof, will be better understood from the following description in which preferred embodiments of the invention are described by way of example.

DESCRIPTION OF THE DRAWINGS

FIG. 1 is a schematic view showing diagrammatically the paths of the signal and reference beams from generation to detection;

FIG. 2 is a schematic view of beam paths through the holographic element of FIG. 1 showing the beam paths in component detail;

FIG. 11 is a plot of the fractional homodyne signal as a function of probe laser wavelength;

FIG. 12 is a plot of the fractional homodyne signal and differential transmission as a function of the applied DC bias voltage;

DESCRIPTION OF THE PREFERRED EMBODIMENT

Figure 3:
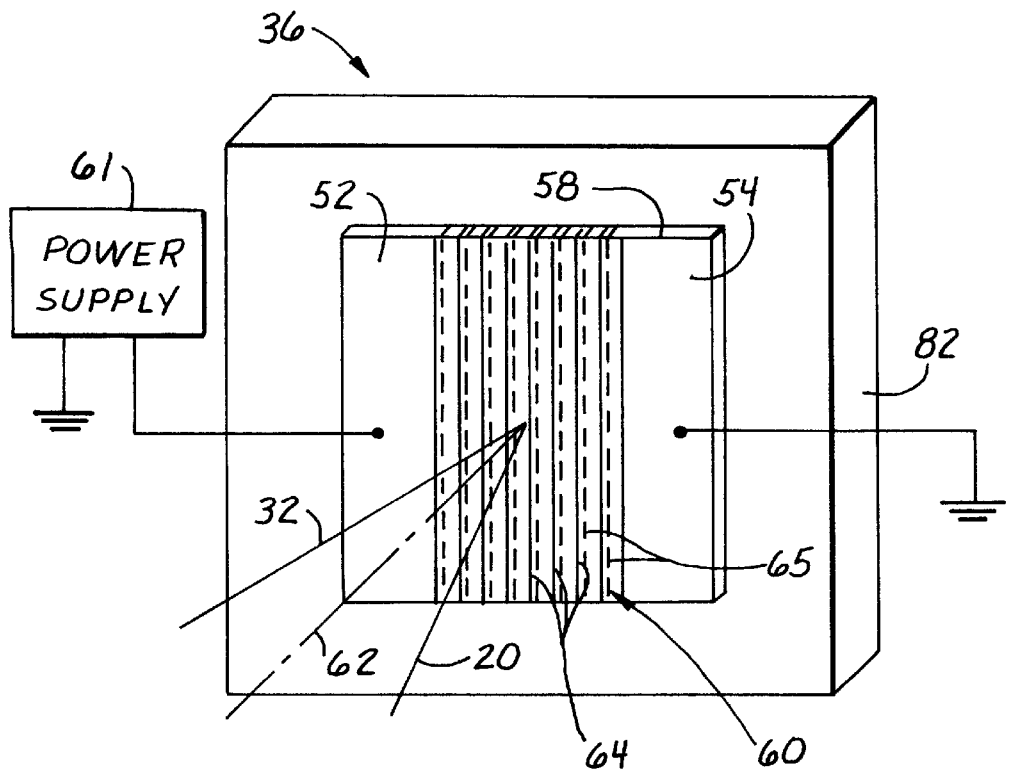
FIG. 3 is a schematic perspective view of a multiple quantum well beamsplitter showing the interference of the two beams.

Referring initially to FIG. 1 of the accompanying drawings where reference numerals correspond to like numerals used in this specification, the reference-beam interferometer two-wave mixing receiver 10 of the preferred embodiment includes a laser generator 12 which generates as its output a coherent light beam 14. The light beam 14 is directed in the direction of the adjacent arrow by mirror 16 to beamsplitter 18 which divides the beam 14 into a reference beam 20 passing through the splitter 18 and into a probe beam 24 directed toward the workpiece or material 26 to be examined. The reference beam 20 is directed by mirror 22 for superposition with the signal wave, as will be described in greater detail below. The probe beam 24 will be reflected or scattered from the normally rough surface 28 as the return signal beam 32 traveling back along its incident path.

The surface 28 of the workpiece is vibrated ultrasonically as a result of a pulsed laser 30. The pulsed laser 30 produces a momentary light beam 31 impinging the workpiece 26 to generate an ultrasonic wave that travels through the workpiece 26 to result in a vibration of the workpiece surface 28.

The vibration or displacement of the workpiece surface 213 will impart phase perturbations on the probe beam 24 when it is reflected back as the return signal beam 32. In addition, the rough surface of the workpiece 26 and turbulence in the optical beam path will cause spatial wavefront distortions on the return signal beam 32.

The distorted return signal beam 32 is guided toward the real-time holographic element 36. The return signal beam 32 is combined or superposed with the reference beam 20 in the holographic element 36, which results in two output beams 40, 44. The superposition of at least parts of the distorted return signal beam 32 and the reference beam 20 form, as the output, the beam 40, which is directed to the photodetector 46.

The difference in the cumulated path length of beam 20 and the path length of beams 24 and 32 between the beamsplitter 18 and the receiving surface of the holographic element 36 should be less than the coherence length of the laser generator 10.

Referring to FIG. 2, the effect of the holographic element 36 on the incident beams 20, 32 is shown in greater detail. The reference beam 20 is partially diffracted as beam 20' and superposed on the distorted beam 32 which is partially transmitted as beam 32'. The superposed components of the partially diffracted reference beam 20' and the partially transmitted signal beam 32' have identical paths and comprise the resultant beam 40 directed to the photodetector 46. The incident reference beam has planar wavefronts 21, while the incident distorted signal beam 32 has distorted wavefronts 33. The resultant beam 40 will have overlapped wavefronts 41 with the same distortion of wavefronts 33 The incident reference beam 20 is also partially transmitted through the holographic element 36 as component beam 20", while the incident distorted beam 32 is partially diffracted by the element 36 as component beam 32". The component beams 20", 32" have identical paths and comprise the resultant beam 44. The resultant beam 44 will have overlapped planar wavefronts 45.

Figure 4:
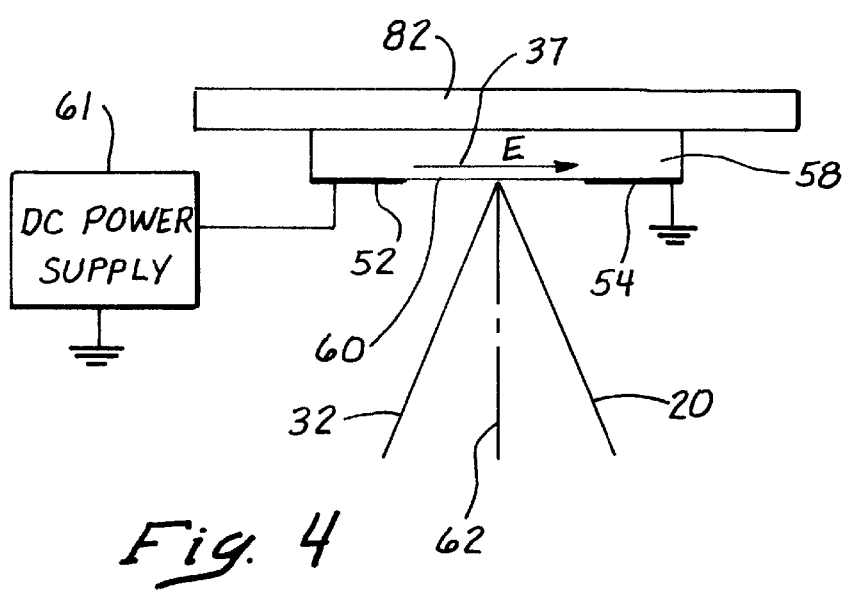
FIG. 4 is a schematic top or plan view of the multiple quantum well beamsplitter of FIG. 3.

Referring to FIG. 3, a perspective view of the structure of the photorefractive multiple quantum well, holographic adaptive beamsplitter element 36 can be seen in greater detail. The element 36 consists of the semiconductor structure 58 with metal electrodes 52,54 mounted on a supporting substrate 82 a few millimeters (mm) thick. The substrate 82 may be sapphire, glass or a pyrex material, as is commonly used. The semiconductor structure 58 has a first electrode 52 and a second electrode 54 at opposite ends of the incident surface 60, best seen in FIG. 4, which is a top or plan view of the holographic element 36 of FIG. 3. A potential field 37 is maintained across the structure 58 between the electrodes 52, 54 by a direct current power supply 61. Between the electrodes 52, 54 a portion of the semiconductor structure 58 is exposed to form the incident surface 60. The surface 60 of the semiconductor structure 58 receives the incident beams 20, 32. A centerline 62 indicating the line normal to the surface 60 is also shown.

The incidence of the two beams 20, 32 onto the surface 60 of the element 36, referring again to FIGS. 3, 4, results in the intensity grating planes 64, caused by the interfering beams. The intensity grating creates the diffracton grating, shown schematically by the evenly dashed lines, 65, in FIG. 3.

Figure 5:
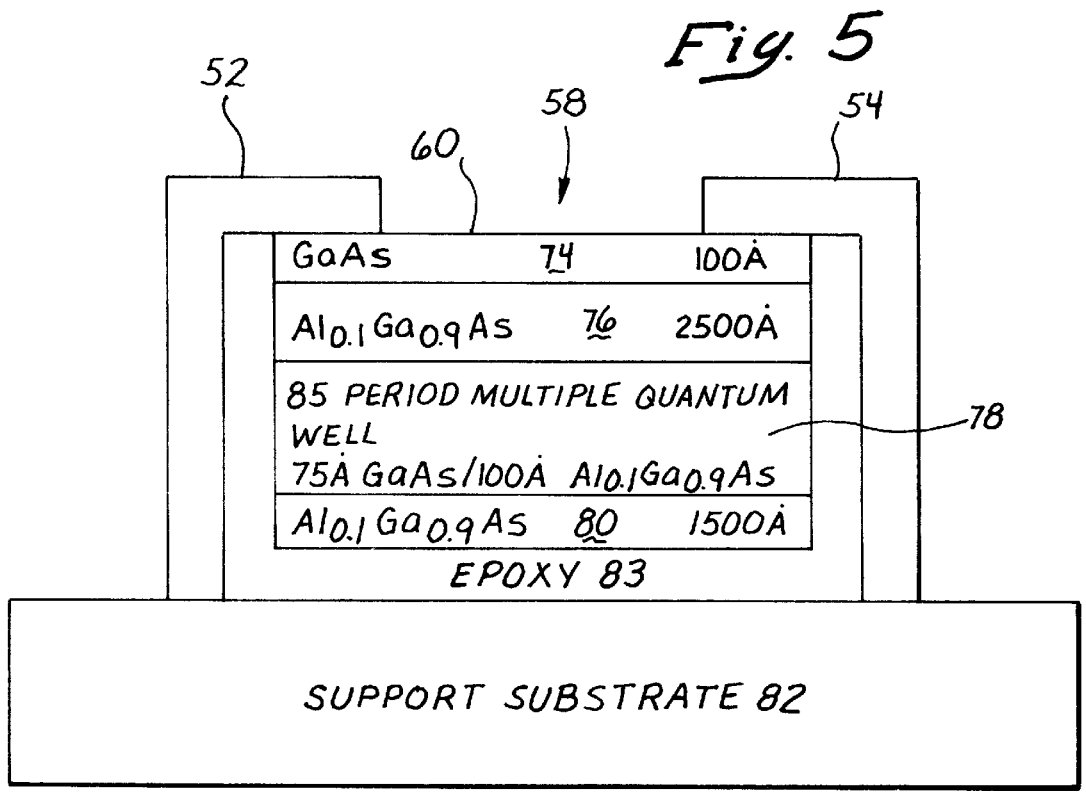
FIG. 5 is a cross-sectional view showing the layers of a multiple quantum well structure of the completed holographic element of the preferred embodiment of the present invention taken along the view of line 5—5 of FIG. 3.

FIG. 5 shows a cross-sectional view of the holographic element 36 comprising the semiconductor structure 58, electrodes 52,54 and supporting substrate 82. As seen in FIG. 5 the semiconductor structure 58 is supported on the substrate 82 using a transparent nonconductive epoxy 83. Specifically shown in FIG. 5 is the supporting substrate 82 and epoxy 83 supporting a first layer 80 consisting of 1500 Angstroms of 10% aluminum gallium arsenide ($Al_{0.1}Ga_{0.9}As$). The next layer 78 is the active photoconductive electro-optic layer and consists of an eighty-five period multiple quantum well structure consisting of alternating layers of 75 Angstrom thick gallium arsenide (GaAs) quantum wells and 100 Angstrom thick 10% $Al_{0.1}Ga_{0.9}As$ barriers. The next layer 76 consists of 10% aluminum gallium arsenide ($Al_{0.1}Ga_{0.9}As$) of approximately 2500 Angstroms thickness. The next layer 74 consists of GaAs at approximately 100 Angstrom thickness. The GaAs layer 74 now forms the top layer of the semiconductor structure 58 and comprises the surface 60 facing the incoming wavefronts 20, 32 (best seen in FIGS. 3,4).

Figure 6:
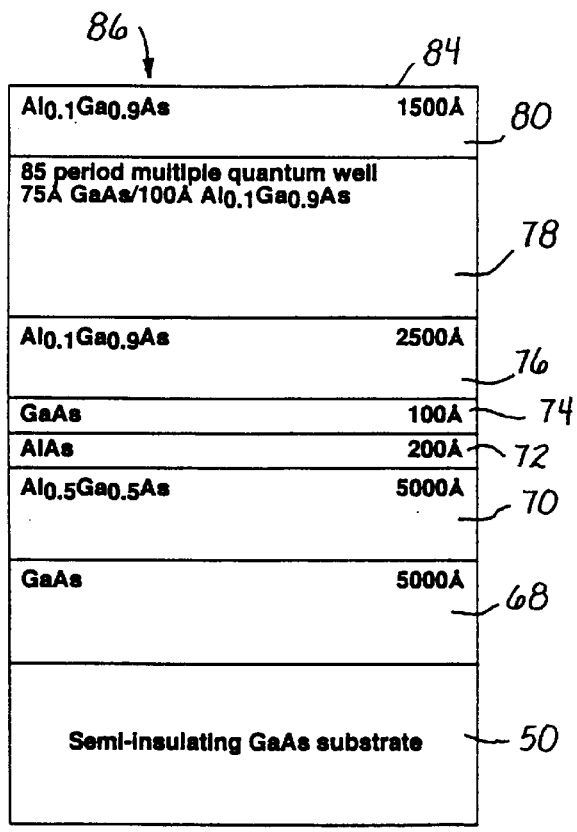
FIG. 6 is a cross-sectional view showing the layers of the multiple quantum well structure of the preferred embodiment of the present invention as shown in FIG. 5 after film growth and before further fabrication.

The method of fabricating the semiconductor structure 58 comprises an epitaxial growth of multiple layers by molecular beam epitaxy, best illustrated in FIG. 6. Beginning with an epitaxial-ready gallium arsenide substrate 50 which is approximately 0.5 millimeter (mm) thick, a first layer 68 of gallium arsenide (GaAs) approximately 5000 Angstroms thick is grown. This layer 68 is useful to planarize the surface to ensure good epitaxial crystal growth. Next, a second layer 70 of 50% aluminum gallium arsenide ($Al_{0.5}Ga_{0.5}As$) is grown approximately for 5000 Angstroms. This layer is used as an etch stop layer during wet chemical etching (19 parts hydrogen peroxide and 1 part ammonium hydroxide) in device fabrication. A third layer 72 of aluminum arsenide (AlAs) is then grown for approximately 200 Angstroms. This layer 72 serves as a lift-off layer during device fabrication which is etched off during a 50% hydrofluoric acid etch in order to form an optically flat surface.

Next a fourth layer 74 of GaAs is grown for approximately 100 Angstroms. This layer 74 plays a role in the fabrication procedure of the final device, which is the stop etch layer for the 50% hydrofluoric acid etch and also acts as a passivation layer of the final device, the photorefractive multiple quantum well, real time holographic element 36. A fifth layer 76 of 10% aluminum gallium arsenide ($Al_{0.1}Ga_{0.9}As$) of approximately 2500 Angstroms thickness is grown next. This spacer layer 76 is used to control the thickness of the device to set the preferred Fabry-Perot condition, to enhance the diffractive performance of the holographic element 36 without changing the optical properties of the active layer 78. A sixth layer 78 comprises an eighty-five period multiple quantum well structure consisting of 75 Angstrom thick GaAs quantum wells and 100 Angstrom thick 10% aluminum gallium arsenide ($Al_{0.1}Ga_{0.9}As$) barriers. This multiple quantum well layer 78 forms the active photoconductive electro-optic layer of the holographic element 36. A seventh layer 80 is grown to approximately 1500 Angstroms consisting of 10% aluminum gallium arsenide ($Al_{0.1}Ga_{0.9}As$).

Characteristics of the multiple quantum well (MQW) can be modified by varying the thickness and/or material composition of the various layers as desired.

The as-grown structure 86 is proton implanted from the top surface 84 of layer 80 at different energies and doses to control the number and profile of defects created in the active electro-optic layer 78. The structure 86 is then cleaved into approximately 2 mm×2 mm squares, and mounted at its top surface 84 as seen in FIG. 5, that is the end having the layer consisting of $Al_{0.1}Ga_{0.9}As$ to a supporting substrate 82 (FIG. 4) using a transparent nonconductive epoxy 83.

The GaAs substrate 50 is lapped using fine alumina grit to a thickness of 100 microns. The structure 86 is then subjected to a wet chemical etch consisting of 19 parts hydrogen peroxide and 1 part ammonium hydroxide. This etch removes the remaining GaAs substrate 50 and the 5000 Angstrom GaIs epilayer 68. The etch stops somewhere in the etch stop layer 70 of $Al_{0.5}Ga_{0.5}As$. The structure 86 is then subjected to a 50% hydrofluoric acid solution which removes the remaining $Al_{0.5}Ga_{0.5}As$ layer 70 and the AlAs layer 72, resulting in an almost optically flat surface of layer 74, which becomes the surface 60. The electrodes 52, 54 are then evaporated on the surface 60 (best seen in FIGS. 3,4,5) with an interelectrode spacing of approximately 1 mm.

Figure 7:
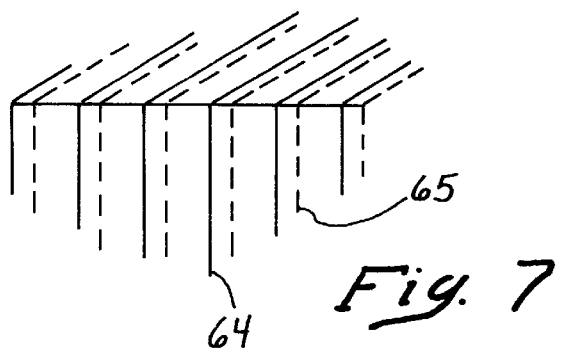
FIG. 7 is an exploded cross-sectional view taken along line 7—7 of G. 3 showing schematically the intensity and diffraction grating patterns within the holographic element.

FIG. 7 shows in an exploded view the patterns of the intensity grating 64 and the complex diffraction grating 65 in the structure 58. The intensity grating is shown schematically by the solid lines 64. The diffraction grating is shown by the dashed lines 65.

In operation, the photorefractive multiple quantum well, real-time holographic element 36 acts as an adaptive beam-splitter matching the wavefronts of the return signal 32 and the reference beam 20. The return signal 32 acquires a phase perturbation relative to the phase of the reference beam 20 caused by the ultrasonic vibration of the surface 28.

When the reference beam 20 and the return signal beam 32 interfere in the photorefractive multiple quantum well holographic element 36, they produce a complex refractive index and absorption grating 65 that records the spatial phase profile of the return signal beam 32. This holographic recording and subsequent readout process yields an output beam 40 that is a composite or superposition of the partially transmitted signal beam 32' and the partially diffracted reference beam 20'. The holographic combination of these beams insures that they have precisely overlapped wavefronts.

The separate beams 20',32' that contribute to the composite beam 40 have a static relative longitudinal phase difference apart from the phase perturbation acquired by the return signal 32 from the ultrasonic vibration of the workpiece surface 28. The static relative longitudinal phase depends on the design of the holographic element 36, on the applied electric field (E) 37 and on the chosen wavelength on the beam 14 from light source 12. These factors determine a spatial shift of the complex grating 65 in the element 36 relative to the optical interference pattern 64 created by the return beam 32 and the reference beam 20. This spatial shift contributes to the static relative longitudinal phase of the separate beams 20',32' that contribute to the composite beam 40. Specifically, this static relative longitudinal phase is equal to the photorefractive phase shift plus or minus the wavelength-dependent phase of the signal 20' diffracted by the complex grating, plus or minus 90 degrees.

Optimally, the static relative longitudinal phase is adjusted in operation such that it is as close as possible to the 90 degree quadrature condition. However, good detection using the principles of this invention is achieved with shifts in the ranges of from 30 degrees to 150 degrees, and from 210 degrees to 330 degrees. In any case, no path-length stabilization is required to maintain this condition as with a conventional interferometer system.

One unique feature of the preferred embodiment of the present invention is the ability to produce the required value of the relative phase by adjusting the applied electric field 37 or by adjusting the wavelength of the laser beam 14.

The relative longitudinal phase for the superposed output beam 40 is independent of any wavefront changes on the input beams 20, 32 due to turbulence, vibrations and the like as long as the wavefront changes occur on a time scale that is slow relative to the grating buildup time. The grating buildup time, as used in this specification, is the time required for the amplitude of the refractive index and absorption gratings to reach a given fraction of its final steady-state value. The changes that occur very rapidly, such as the perturbations modulated on the return distorted signal beam 32 as a result of the ultrasonic vibrations of the workpiece surface 28, will be transferred to the output beam 40 and be detected by the detector 46. It has been found that a suitable detector 46 may be a Model 1801 provided by New Focus, Inc. of Santa Clara, Calif.

As described above, the homodyne interferometer constructed of the photorefractive quantum wells operates by combining two coherent laser beams consisting of the signal beam 32 and the reference beam 20. Their interference pattern 64 is converted into a complex diffraction grating 65 in the photorefractive quantum well layer 78. The diffraction grating 65 is composed of changes in both the refractive index and the absorption. The periodicity of the diffraction grating 65 matches the periodicity of the interference intensity pattern 64 generated by beams 32 and 20. However, the complex diffraction grating 65 is generally shifted relative to the intensity pattern 64. This spatial shift of the gratings is described in terms of the photorefractive phase shift $\phi_0$.

A key parameter that allows different homodyne interferometers to be compared is the signal-to-noise ratio of the laser-based ultrasound device. The signal-to-noise ratio defines the smallest surface displacement that can be detected above the noise level for a defined detection bandwidth and for a defined power level on the detector.

For the embodiment of the homodyne interferometer described here, the signal is determined by a complex phase shift of the electromagnetic wave after traversing the thin semiconductor film. The complex phase shift is $$\delta_K = \frac{2\pi n_K(\lambda) L}{\lambda \cos\theta'} + i \frac{\alpha_K(\lambda) L}{2\cos\theta'} \quad (1)$$

where $\lambda$ is the wavelength, L is the thickness of the active layer 78, $\theta'$ is the angle between the direction of propagation and the surface normal, $n_K$ is the wavelength-dependent K-th Fourier coefficient of the refractive index grating and $\alpha_K$ is the K-th Fourier coefficient of the absorption grating in the device, where K=±1,0 are the grating vectors of interest in two-wave mixing.

This complex phase shift modulates the amplitude and phase of the reference wave 20 causing it to partially diffract in the direction of the signal beam 32. The copropagating partially diffracted wave 20' and the partially transmitted signal beam 32' together comprise the beam 40 that reaches the photodetector 46.

Homodyne detection occurs because there is a phase relationship between the partially diffracted reference beam 20' and the partially transmitted signal beam 32'. The superposed beam 40 is given by $$E_{40} = E_{32}\exp(i\delta_0) + \frac{1}{2}\delta_1 E_{20}\exp i\left(\delta_0 + \phi_0 + \frac{4\pi}{\lambda} d(t) + \frac{\pi}{2}\right), \quad (2)$$

where $E_{40}$ is the amplitude of the combined beam after leaving the holographic element 36, $E_{32}$ is the amplitude of the signal beam incident on the holographic element 36, $E_{20}$ is the amplitude of the reference beam incident on the holographic element 36, $\phi_0$ is the photorefractive phase shift defined by the spatial shift of the optical gratings relative to the intensity pattern, and d(t) is the time-dependent surface displacement of the workpiece surface 28.

The combined beam 40 can be expressed as $$E_{40} = \exp(i\delta_0)\left[E_{32} + |\gamma| E_{20}\exp i\left(\phi_0 + \beta(\lambda) + \frac{4\pi}{\lambda} d(t) + \frac{\pi}{2}\right)\right] \quad (3)$$

where $$\beta(\lambda) = \tan^{-1}\left[\frac{\lambda}{4\pi} \frac{\alpha_1(\lambda)}{n_1(\lambda)}\right] \quad (4)$$

is a phase associated with the relative contributions of the index and absorption gratings to the beam 40, and $$|\gamma(\lambda)| = \sqrt{\left(\frac{\pi n_1(\lambda) L}{\lambda \cos\theta'}\right)^2 + \left(\frac{\alpha_1(\lambda) L}{4\cos\theta'}\right)^2} \quad (5)$$

is the magnitude of the coupling efficiency between the two beams 20 and 32.

The optimal homodyne detection occurs when the total relative longitudinal phase of partially transmitted signal beam 32' relative to the partially diffracted reference beam 20' is equal to $\pi/2$. From Equation(3) this condition is satisfied when $$\phi_0 = -\beta(\lambda) \quad (6)$$

This condition satisfies the requirements for linear detection of the surface displacement d(t).

The photorefractive phase shift $\phi_0$ of the photorefractive quantum wells is a function of the applied electric field, the fringe spacing, the wavelength or the defect density. The unique feature of the photorefractive quantum wells is that condition of Equation (6) can always be satisfied for any photorefractive phase shift $\phi_0$ tuning the wavelengths around the excitonic resonances.

Using the above relations we can write an expression for the total power in the combined beam 40 incident on the detector:

$$P_{40} = \left[\left|E_{32}\right|^2 + |\gamma|^2 \left|E_{20}\right|^2 + 2|\gamma| E_{20} E_{32} \sin\frac{4\pi}{\lambda} d(t)\right]\exp(-\alpha_o L), \quad (7)$$

where $\alpha_o$ is the static value of the absorption coefficient. If we assume that $|\gamma|\ll 1$ and write $d(t)=d_o\cos(\omega t)$, then $$P_{40} = \left[\left|E_{32}\right|^2 + 2|\gamma| E_{20} E_{32} \frac{4\pi}{\lambda} d_o \cos(\omega t)\right]\exp(-\alpha_o L). \quad (8)$$

As expected from the principles of coherent detection, the introduction of a sinusoidal phase modulation produces an amplitude-modulated signal at the photodetector.

Using similar concepts, the signal-to-noise ratio (S/N) is given by $$\frac{S}{N} = \frac{\eta(\Delta P_{40})/h\nu}{\sqrt{\frac{\eta P_{32} e^{-\alpha_o L}}{h\nu}(\Delta f)}}, \quad (9)$$

where $\eta$ is the quantum efficiency, $\Delta P_{40}$ is the magnitude of the time-varying portion of the transmitted power [given by the second term in Equations (7) and (8)], $h\nu$ is the photon energy, and $\Delta f$ is the detection bandwidth. Substituting for $\Delta P_{40}$, we find $$\frac{S}{N} = \sqrt{\frac{\eta P_{20}}{h\nu(\Delta f)}} \; e^{-\frac{\alpha_0 L}{2}} \left| \gamma(\lambda) \right| \left| \frac{4\pi}{\lambda} d(t) \right| \tag{10}$$

Another commonly used parameter used to characterize a laser ultrasonic receiver is the minimum detectable surface displacement amplitude $d_{min}$, expressed in Angstroms times the square root of W/Hz. This parameter corresponds to the minimum detectable displacement (for which S/N=1) for 1 watt (W) incident power and 1 Hertz (Hz) detection bandwidth. With this definition, the minimum detectable surface displacement amplitude can be written as $$d_{min}(\lambda) = \frac{\lambda}{4\pi} \sqrt{\frac{h\nu}{\eta}} \frac{1}{|\gamma(\lambda)|} \exp\left(\frac{\alpha_o L}{2}\right) \tag{11}$$

where the minimum detectable displacement ($d_{min}$) is a function of wavelength and is a minimum near the center wavelength of the exciton transitions. For the structure described in the Example given below, the projected value at the peak of the curve is approximately $d_{min}$=2.9×10$^{-6}$ Å (W/Hz)$^{1/2}$. We have extended this same calculation to a structure with 30% aluminum barriers, for which we find $d_{min}$=5.5×10$^{-7}$ Å (W/Hz)$^{1/2}$. This value is substantially better than the value for a confocal Fabry-Perot interferometer in transmission, but with a broader bandwidth and without the requirement for length stabilization.

In an experiment using the real-time holographic adaptive beamsplitter 36 using the photorefractive multiple quantum well structure 58 of the preferred embodiment of our invention, an example showing the sensitivity and efficiency of the present invention can be seen. We set forth below the conditions and results thereof, by way of example in order to further describe our invention:

EXAMPLE

The photorefractive multiple quantum well, holographic beam splitter element 36 as described was further characterized in an interferometer 10 setup similar to that shown in FIG. 1. The probe laser 12 was an SDL laser, Model #5412-H1 emitting a coherent beam 14 at a wavelength near 850 nm. The spacing between the metal electrodes 52, 54 was 0.8 mm. In this characterization of the element 36, the workpiece or material to be examined 26, was replaced by a mirror. The reference beam 20 and the returned signal beam 32 are combined or superposed in the holographic element 36, which results in two output beams 40 and 44. The returned signal beam 32 was modulated by an electro-optic phase modulator driven by a voltage amplifier modulator driver. The angle between the two laser beams 20 and 32 was set to obtain an interference pattern (grating lines 64 shown in FIG. 3) with a period of 24 microns. The incident laser intensities on the element were ≈17 μw and 50 μW in beams 32 and 20 respectively.

The ability of the element 36 to operate as a holographic beam splitter was first characterized by measuring the change in the absorptive properties. For this characterization the returned signal beam 32 is blocked and the transmission of the plane wave reference beam 20 is monitored by placing a photodiode in the path of the output beam 44. The voltage applied to the device was 500 V DC The transmission of the device was monitored as a function of wavelength by temperature tuning the probe laser 12 by changing the set position of the thermoelectric cooler. The differential transmission of the element 36, ΔT/T, is defined as the change in transmission due to the field divided by the zero field transmission $$\frac{\Delta T}{T} = \frac{T_E - T_0}{T_0}, \tag{12}$$

where $T_E$ is the transmission with the electric field turned on and $T_O$ is the transmission without the electric field.

Figure 8:
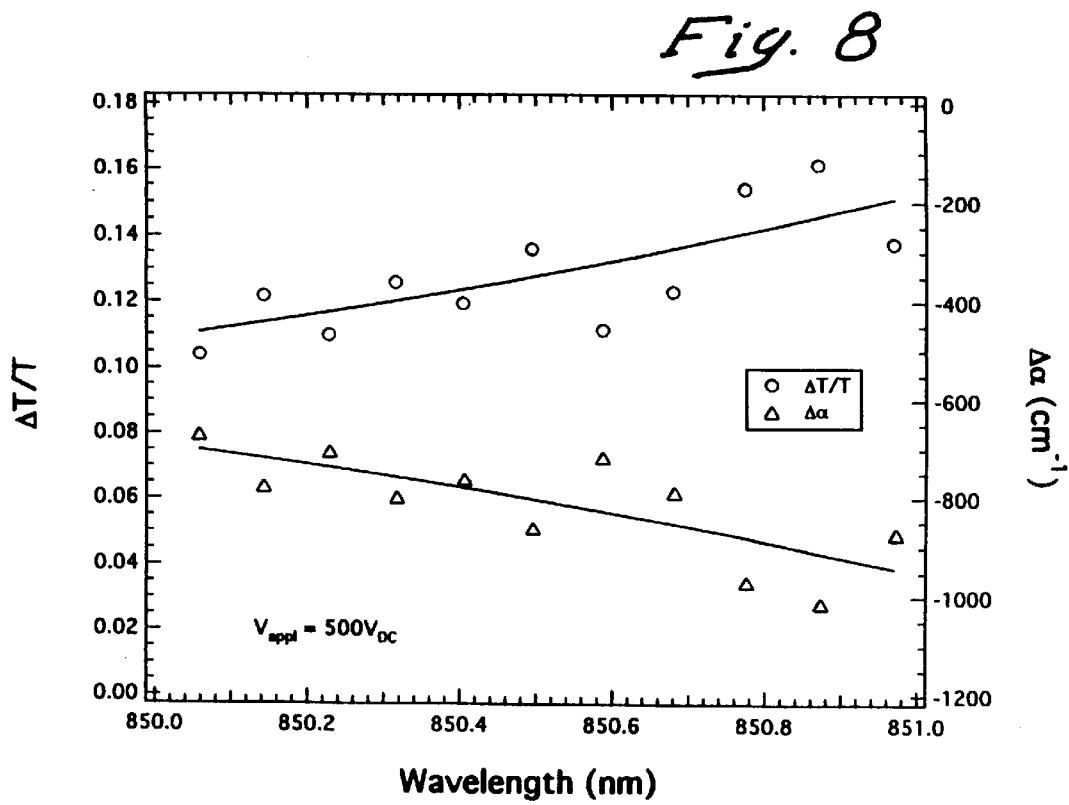
FIG. 8 is a plot showing the change in transmission through the MQW sample and the inferred absorption change as a function of applied field.

The change in the absorptive properties Δα of the element 36 can be calculated knowing the differential transmission of the element, ΔT/T. This is given by $$\Delta\alpha = -\frac{1}{L}\ln\left(1 + \frac{\Delta T}{T}\right) \tag{13}$$

where L is the thickness of the active region 78 of the photorefractive multiple quantum well, holographic beam splitter element 36. The differential transmission and the change in absorption of the element is shown in FIG. 8. The change in absorption exceeds 1000 cm$^{-1}$ making the element viable for the measurement of ultrasonic vibrations.

Figure 9:
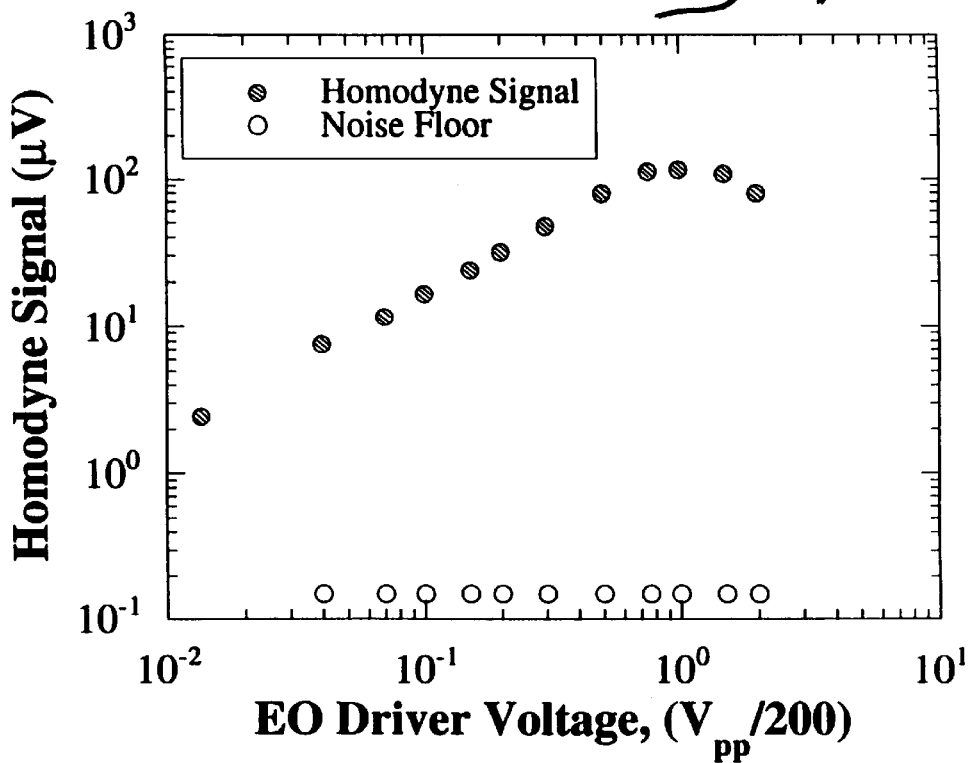
FIG. 9 is a plot showing the homodyne signal as a function of drive voltage applied to the electro-optic phase modulator.

The role of the photorefractive multiple quantum well holographic beam splitter element 36, was then characterized by measuring the homodyne detection properties of the receiver 10. A phase modulation was introduced on the return signal beam 32 using an electro-optic phase modulator, which simulates the vibrating test object, and hence mimics a surface displacement. The element 36 was biased at 920 V peak-to-peak single-sided square wave at a repetition rate of 1.5 kHz. The electro-optic phase modulator was driven with a 100 kHz sine wave. The time-varying homodyne signal from detector 46 was measured using a phase-sensitive (or lock-in) amplifier (bandwidth of 1 Hz) tuned to 100 kHz. The homodyne signal was found to be linear for electro-optic drive voltages from 8 V to 200V peak-to-peak (corresponding to effective surface displacements of 50 milliradians to 1.25 radians) at ≈850 nm. This is shown in FIG. 9.

Figure 10:
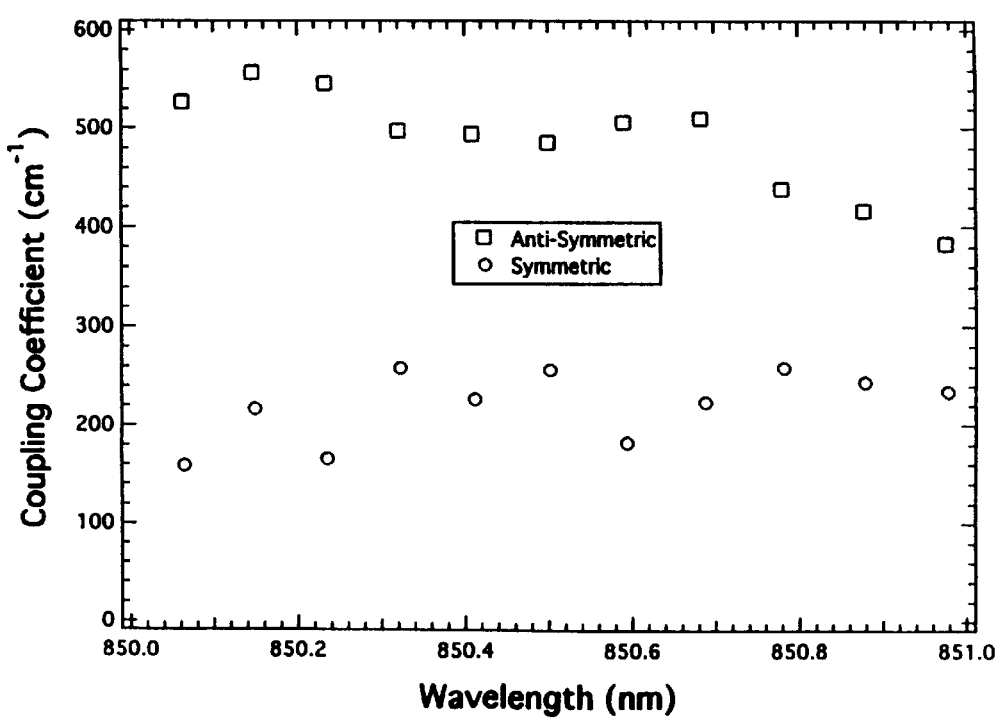
FIG. 10 is a plot of the symmetric and the antisymmetric coupling coefficients as a function of probe laser wavelength.

Two-beam coupling experiments were conducted to further characterize the photorefractive multiple quantum well holographic beam splitter element 36. The transmission of the returned beam 32, i.e., beam 40 was detected at the detector 46. The element 36 was biased with a 500 V DC voltage. The plane wave reference beam 20 was chopped at a frequency of 277 Hz. The magnitude of the two-beam coupling was measured as a change in the intensity of beam 40, ΔI(+). The change in the intensity of beam 40 was also measured while the element 36 was biased at −500 V DC as ΔI(−). The transmission of the beam through the element 36, beam 40, was also measured with the element 32 unbiased while chopping beam 32, as I. The antisymmetric and symmetric contribution of the two-wave mixing coupling coefficients give the strength of the index and absorption gratings present in the element 36. These coefficients are given by $$\Gamma_{sym} = \frac{1}{L}\frac{\Delta I(+) + \Delta I(-)}{2I} \tag{14}$$

$$\Gamma_{asym} = \frac{1}{L}\frac{\Delta I(+) - \Delta I(-)}{2I}, \tag{15}$$

where $\Gamma_{sym}$ is the symmetric contribution to the coupling coefficient, $\Gamma_{asym}$ is the antisymmetric contribution to the coupling coefficient and L is the thickness of the active layer 78. These two contributions are plotted in FIG. 10 as a function of wavelength 14 of the probe laser 12.

The spectral response of the fractional homodyne signal is shown in FIG. 11 as a function of the wavelength of the output beam 14 from the probe laser 12. The fractional homodyne signal is given by the amplitude of the sinusoidal portion (provided by the phase-sensitive amplifier) divided by the magnitude of the steady portion of the signal, as provided from the detector 46. Here, the element 36 was biased at 500 V DC across the 0.8 mm electrode spacing. The returned signal beam 32 was phase modulated with an electro-optic phase modulator driven with a 100 V peak-to-peak 100 kHz sine wave. The output beam 40, which is a composite of both the partially diffracted reference beam 20' and the partially transmitted signal beam 32' was detected using lock-in detection. The ratio of the intensity in the reference beam 20 to the returned signal beam 32 was set to 3. A large fractional modulation of the homodyne signal (6%) was observed.

The dependence of the fractional homodyne signal was studied as a function of the DC bias on the element 36 to further enhance the performance. This is shown in FIG. 12. Large fractional modulation (7%) was again observed. Also shown is the change in the differential transmission, ΔT/T of the element 36.

Figure 13:
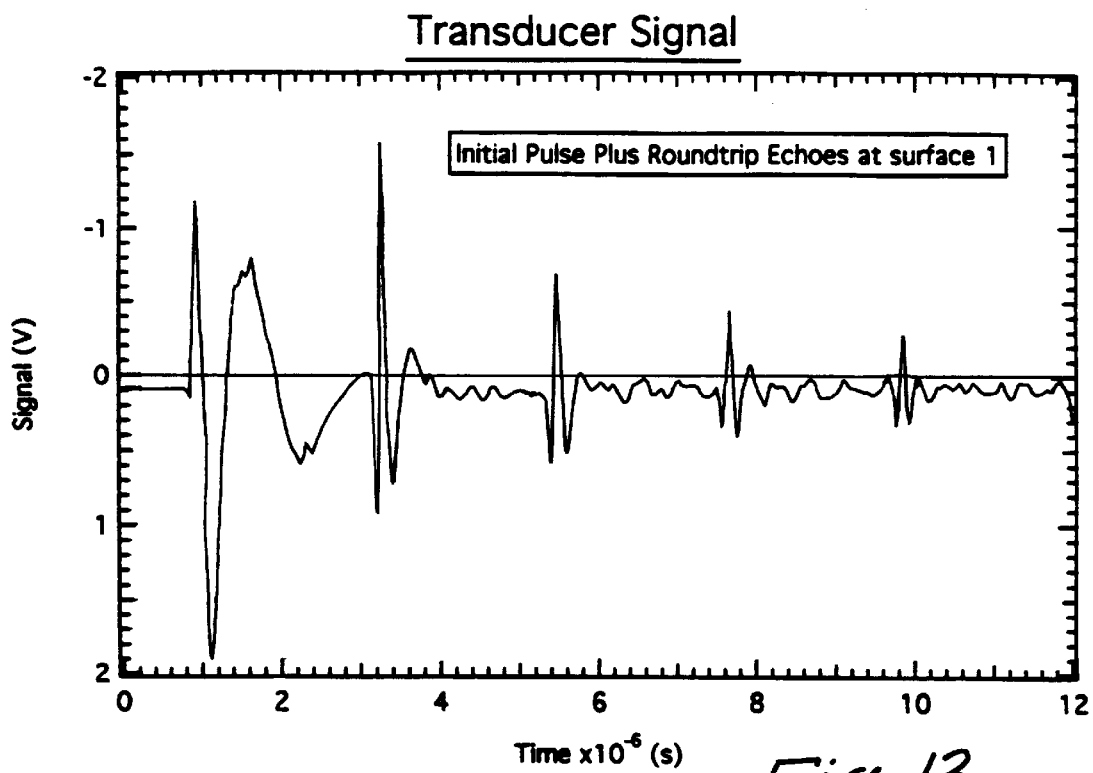
FIG. 13 is a oscilloscope trace of the homodyne signal as a function of time for ultrasonic pulse generation by a transducer on a mirror.
Figure 14:
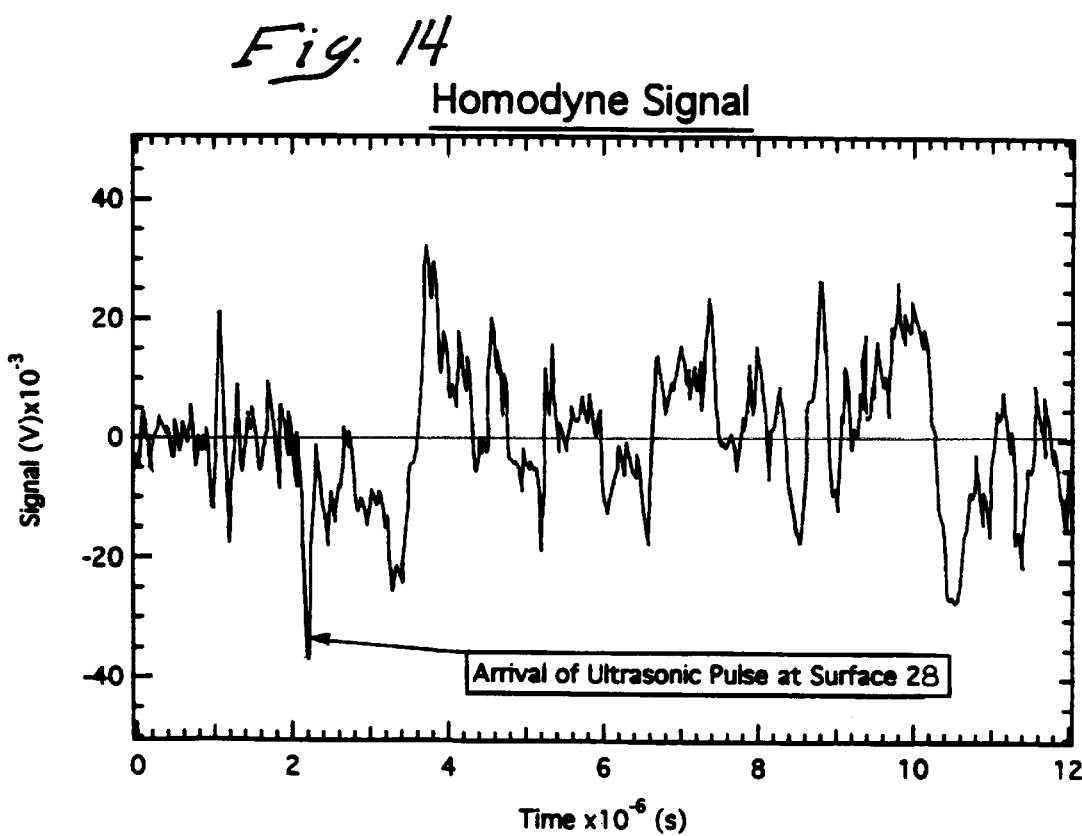
FIG. 14 is an oscilloscope trace of the transducer signal, showing the first generated pulse and multiple echoes from the opposite (mirrored) surface.

To simulate laser based ultrasound applications for single shot, large bandwidth detection, we replaced the workpiece or material to be examined 26 with a mirror in which a single pulse of ultrasound was generated by a transducer mounted on the rear surface. The signal from detector 46 was fed to an oscilloscope with a 10 MHz bandwidth. The element 36 was biased with a 500 V DC voltage. FIG. 13 shows the homodyne signal observed on the oscilloscope as a function of time. The transducer signal is shown for reference in FIG. 14. The arrival of the first ultrasonic pulse at the front surface of the mirror (surface 28) is clearly evident.

The foregoing detailed description of my invention and of preferred embodiments as to products, compositions and processes, is illustrative of specific embodiments only. It is to be understood, however, that additional embodiments may be perceived by those skilled in the art. For example, while the present invention has been described with reference to the multiple quantum well structure as illustrated in FIGS. 5 and 6, the number of the quantum wells or layers may be varied to suit design choices and considerations. For example, the number of repetitions in the 85-period multiple quantum well layer 78 may be reduced to as few as three layers, one and a half periods, which in the consideration of some may not be termed a "multiple" quantum well structure. In this specification, the term "multiple quantum well" is used and meant to include such three-layer or one and a half period structure. The ability to control the phase and to achieve the desired design features can to some extent be accomplished with such more simple design structures.

We claim:

1. A method for detecting sonic vibrations in a test material having a test surface comprising:
   a. generating a coherent beam of light having a wavelength;
   b. splitting said coherent beam into a first beam and a second beam;
   c. first directing said first beam onto said test surface to be scattered by said test surface to result in said scattered first beam having a first phase perturbation;
   d. second, directing at least a portion of said scattered first beam and said second beam on a multiple quantum well adaptive beam splitter, wherein said first and said second beams are made co-propagating and with superposed wavefronts; and,
   e. third, directing said co-propagating superposed first and second beams onto a photodetector to result in an electrical output signal that is representative of the vibrating test surface.

2. The method of claim 1 wherein said second directing step, the further step of producing an electrical output signal that is linearly proportional to said first phase shift introduced onto said first beam.

3. The method of claim 1 wherein in said second directing step, the further steps of forming of a diffraction grating in the multiple quantum well adaptive beam splitter, and of producing a predetermined phase difference between said first beam and said second beam.

4. The method of claim 3 wherein in said step of producing a predetermined phase difference, said predetermined phase difference is established by applying an electrical field across said multiple quantum well adaptive beam splitter.

5. The method of claim 3 wherein in said step of producing a predetermined phase difference, said predetermined phase difference is established by adjusting the wavelength of the coherent beam of light.

6. The method of claim 3 wherein said phase shift produced by said grating is substantially different from zero and substantially different from 180 degrees.

7. The method of claim 6 wherein said phase shift is in the ranges of from 30 degrees to 140 degrees and from 210 degrees and 330 degrees.

8. The method of claim 7 wherein said phase shift is approximately 90 degrees.

9. The method of claim 7 wherein said phase shift is approximately 270 degrees.

10. The method of claim 1 wherein said generated coherent light beam is a polarized light beam, and wherein said first and said second beams are co-propagating and co-polarized after said second directing step directing said first and said second beams onto said multiple quantum well adaptive beam splitter.

11. The method of claim 1 wherein said sonic vibrations are small vibrational surface deflections.

12. The method of claim 11 wherein said sonic vibrations are on the order of ultrasonic surface vibrations.

13. The method of claim 12 wherein said sonic vibrations are in the range of from one megahertz to fifty megahertz.

14. An apparatus for sensing sonic vibrations on a material having a test surface, comprising:
   a. light generating means for generating a coherent, co-polarized beam of light having a predetermined wavelength;
   b. beam splitting means for receiving said generated light beam, splitting said generated light beam into at least a first light beam and a second light beam, and for directing said first light beam onto a test material test surface capable of at least scattering said first beam;
   c. multiple quantum well adaptive beam splitter means having a multiple quantum well structure including a receiving surface for receiving at least a portion of said scattered first light beam at a first angle relative to said multiple quantum well receiving surface, and for receiving said second light beam at a second angle relative to said multiple quantum well receiving surface which second angle is different from said first angle, for interfering said first and said second beams to introduce a phase shift difference between said first and said second beams, and for producing at least one set of co-propagating light waves comprising at least a portion of said first beam and at least a portion of said second beam received by said multiple quantum well receiving surface; and, d. photodetector means positioned to receive said one set of co-propagated light beams from said multiple quantum well adaptive beam splitter means, for producing an electrical output signal that is representative of the vibrating test surface.

15. The apparatus for sensing sonic vibrations on a material test surface of claim 14 wherein said multiple quantum well adaptive beam splitter means comprises electrical field means for establishing across said multiple quantum well structure a controllably variable electrical field for predetermining the phase difference between said first and said second beams.

16. The apparatus for sensing sonic vibrations on a test surface of claim 15 wherein said multiple quantum well adaptive holographic beam splitter means further comprises a spatial grating in said multiple quantum well structure when receiving said first and said second light beams, and wherein said electrical field means further includes means for changing said spatial grating in said multiple quantum well structure resulting from said interfering beams, by controlling said predetermined wavelength.

17. The apparatus for sensing sonic vibrations on a test surface of claim 14 wherein said means for producing a phase shift produces a phase shift substantially different from zero and substantially different from 180 degrees.

18. The apparatus for sensing sonic vibrations on a test surface of claim 14 wherein said means for producing a phase shift produces a phase shift in the ranges of from 30 degrees to 150 degrees and from 210 degrees to 330 degrees.

19. The apparatus for sensing sonic vibrations on a test surface of claim 18 wherein said means for producing a phase shift produces a phase shift of approximately 90 degrees.

20. The apparatus for sensing sonic vibrations on a test surface of claim 18 wherein said means for producing a phase shift produces a phase shift of approximately 270 degrees.

21. The apparatus for sensing sonic vibrations on a test surface of claim 14 wherein said generating means includes means for generating a polarized light beam, and wherein said multiple quantum well adaptive beam splitter means includes means for co-propagating said first and said second beams in a co-polarized state.

22. The apparatus for sensing sonic vibrations on a test surface of claim 14 wherein said photodetector means includes means for producing an output signal representative of ultrasonic vibrations of said vibrating test surface.

23. The apparatus for sensing sonic vibrations on a test surface of claim 14 wherein said photodetector means includes means for producing an output signal representative of vibrations of said vibrating test surface in the range of from one megahertz to fifty megahertz.

24. The apparatus for sensing sonic vibrations on a test surface of claim 14 wherein said first light beam comprises a phase perturbation resulting from being directed onto said test surface, and wherein said photodetector means comprises means for producing an output signal that is linearly proportional to said phase perturbation of said first light beam.

* * * * *